United States Patent
Høgholt

(10) Patent No.: US 6,250,876 B1
(45) Date of Patent: Jun. 26, 2001

(54) MECHANICAL SEAL WITH FLUSHING ARRANGEMENT

(75) Inventor: Stine Høgholt, Horsens (DK)

(73) Assignee: APV Fluid Handling Horsens A/S, Horsens (DK)

( * ) Notice: Subject to any disclaimer, the term of this patent is extended or adjusted under 35 U.S.C. 154(b) by 0 days.

(21) Appl. No.: 09/423,437

(22) PCT Filed: May 20, 1998

(86) PCT No.: PCT/DK98/00202

§ 371 Date: Nov. 9, 1999

§ 102(e) Date: Nov. 9, 1999

(87) PCT Pub. No.: WO98/54469

PCT Pub. Date: Dec. 3, 1998

(30) Foreign Application Priority Data

May 27, 1997 (DK) ................................... 0601/97

(51) Int. Cl.$^7$ ............................... F04D 29/12; F16J 15/34
(52) U.S. Cl. ............................................. 415/17; 415/112
(58) Field of Search .................................. 415/13, 17, 47, 415/112, 118, 168.2

(56) References Cited

U.S. PATENT DOCUMENTS

| | | | |
|---|---|---|---|
| 2,731,282 | * 1/1956 | McManus et al. | 415/172.1 X |
| 2,769,395 | * 11/1956 | Olson, Jr. | 415/118 X |
| 2,853,020 | 9/1958 | Hollinger et al. | |
| 2,915,975 | * 12/1959 | Kittrell et al. | 417/9 |
| 3,370,542 | * 2/1968 | Harney | 415/47 |
| 3,392,983 | * 7/1968 | Hajner | 415/172.1 X |
| 3,484,113 | 12/1969 | Moore . | |
| 3,708,245 | * 1/1973 | King | 417/13 |
| 3,741,679 | 6/1973 | Johnston . | |
| 5,173,019 | * 12/1992 | Sdano | 415/118 |
| 5,263,825 | * 11/1993 | Doolin | 417/63 |
| 5,605,436 | 2/1997 | Pederson | 415/170.1 |

* cited by examiner

*Primary Examiner*—John E. Ryznic
(74) *Attorney, Agent, or Firm*—McDermott, Will & Emery

(57) ABSTRACT

Centrifugal pump, in particular a hygienic centrifugal pump, provided with a primary and a secondary shaft seal (7,8) at the rear wall (2) of the pump chamber (1). Cooling flushing and barrier fluid is passed to and from a compartment (12) between these seals (7,8), optionally in a flushing fluid circuit. A sensor means (18) is provided in a discharge pipe (16) from the compartment (12) and adapted to measure at least the turbidity, electrical conductivity and temperature of the flushing fluid for activation of an alarm in case of leaking pump fluid through the primary seal (7). As a result the centrifugal pump is more sensitive to leaking pump fluid through the primary seal such that the pump activates an alarm (or optionally shuts down), if the leakage is too extensive.

12 Claims, 1 Drawing Sheet

MECHANICAL SEAL WITH FLUSHING ARRANGEMENT

TECHNICAL FIELD

The invention relates to a centrifugal pump, in particular a hygienic centrifugal pump, provided with a primary and a secondary shaft seal at the rear wall of the pump chamber and in which cooling flushing and barrier fluid (hereinafter referred to as flushing fluid) is passed to and from the compartment between said seals, optionally in a flushing fluid circuit.

BACKGROUND ART

It is known to arrange thermo sensors in the flow path of the flushing fluid from the technical field of centrifugal pumps with dual shaft seal and in which the compartment between the primary seal and the secondary seal is flushed with cooling flushing fluid However, this arrangement does not function quite satisfactorily, if for instance the pump fluid is the same or substantially the same temperature as the flushing fluid. The monitoring thus becomes less reliable.

BRIEF DESCRIPTION OF THE INVENTION

The object of the invention is to provide a centrifugal pump of the above type which is more sensitive to leaking pump fluid through the primary seal than known pumps such that the pump itself activates an alarm (or optionally shuts down), if the leakage becomes too extensive.

The centrifugal pump according to the invention is characterised in that a sensor means is provided in or at a discharge pipe from the compartment between the primary seal and the secondary seal, said means being adapted to measure at least the turbidity, electrical conductivity and temperature of the flushing fluid for activation of an alarm in case of leaking pump fluid through the primary seal. As a result the pump operates in a particularly reliable manner due to the early detection of any leakage at the primary seal. Another reason for the reliability is that an alarm is activated, if the pump fluid leaks through the primary seal, even when a clear pump fluid with the same temperature as the flushing fluid is used. In the instance the electrical conductivity thus causes the sensor means to render a signal. In other situations the sensor means reacts to the changed transparency (turbidity) of the flushing fluid or a change in temperature thereof. In many cases all of the parameters: turbidity, temperature, electrical conductivity are changed at the same time. When an alarm signal is rendered, the motor of the centrifugal pump may be turned off automatically to stop the pump.

According to the invention the sensor means may comprise at least three sensor members, viz a sensor member for measuring the turbidity of the flushing fluid, a sensor member for measuring the electrical conductivity and a sensor member in form of an electric temperature sensor for measuring the temperature of the flushing fluid, said sensor members, which are adapted to render electric signals, are parallel coupled and connected to an electric alarm system such as an alarm circuit, e.g. on a chip. As a result the pump is particularly sensitive, as it reacts at practically any pump fluid leakage through the primary seal.

Furthermore according to the invention the sensor member for measuring the turbidity may be a photo cell provided with a light-emitting diode. This embodiment has proved particularly reliable.

Moreover according to the invention the sensor member for measuring electric electrical conductivity may be formed of two mutually interspaced electrodes in form of steel legs, whereby the centrifugal pump is highly sensitive to leakage through the primary seal.

According to the invention the sensor member for measuring the temperature may be formed of a thermometer indicating the temperature digitally, whereby the centrifugal pump becomes particularly reliable.

Furthermore according to the invention the sensor means may be built-in in the compartment between the primary seal and the secondary seal close to the location at which the flushing fluid is discharged from the compartment, whereby the reliability is enhanced, as the sensor means is well-protected, According to the invention the signals from the sensor members may be standardised before they are processed in the alarm device to obtain easy comparison and processing of the signals.

Moreover according to the invention the processing of the signals in the alarm device may be performed in a logical OR-circuit, which has proved particularly advantageous.

According to the invention the signals from the three sensor members may be transferred to a neural network for recognition of signal patterns which have proved to be characteristic of the operation modes to be monitored. This renders a particularly reliable detection.

According to the invention the alarm device may be adapted to monitor the change of the signals as time goes by resulting in enhanced detection sensitivity.

Furthermore according to the invention each of the sensor members may be adjusted to a specific threshold value which must be exceeded, before the alarm device accepts the signal from the sensor member in question, whereby the number of false alarms is reduced.

Finally according to the invention the threshold values may be adjusted to obtain the most advantageous relation between the probability of detecting an undesired event (leakage) and the probability of a false alarm. The probability of detecting an undesired event (the leakage) is thus improved at the same time as the probability of a false alarm is kept to a minimum.

BRIEF DESCRIPTION OF THE DRAWING

The invention is explained in detail below with reference to the drawings, in which.

BEST MODE FOR CARRYING OUT THE INVENTION

Figure 1:
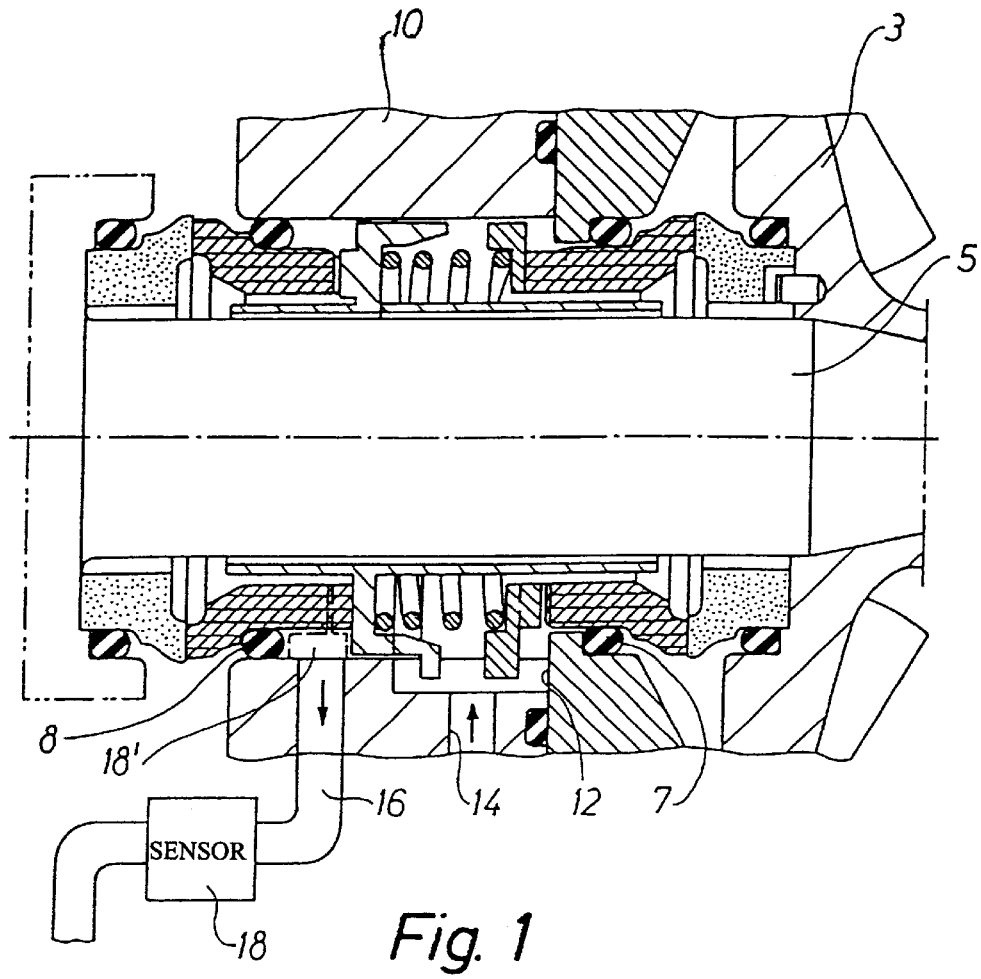
FIG. 1 illustrates a portion of the rear wall and the impeller in a centrifugal pump according to the invention, in which a sensor means is mounted in the flushing fluid discharge pipe from the compartment between the primary shaft seal and the secondary shaft seal of the pump.

The centrifugal pump illustrated in FIG. 1, from which a portion of the rear wall 2 and the impeller 3 of the pump chamber 1 is evident, is provided with a dual shaft seal, viz a primary seal 7 in the rear wall 2 and a secondary seal 8 at a rear body 10 attached to the rear wall. Flushing and barrier fluid, e.g. water, (hereinafter referred to as flushing fluid) is initially led through an inlet passage 14 to a compartment 12 formed between the shaft seal 7, the rear body 10 and the shaft seal 8. Subsequent to having passed through said compartment the fluid is discharged through a discharge pipe 16.

As shown diagrammatically, a sensor means 18 is provided in the discharge pipe 16 from the compartment 12. The sensor means is intended to measure the turbidity (transparency), the electrical conductivity and the temperature of the flushing fluid so as to activate an alarm in case of leaking pump fluid from the pump chamber 1 through the primary seal 7 to the compartment 12.

Figure 2:
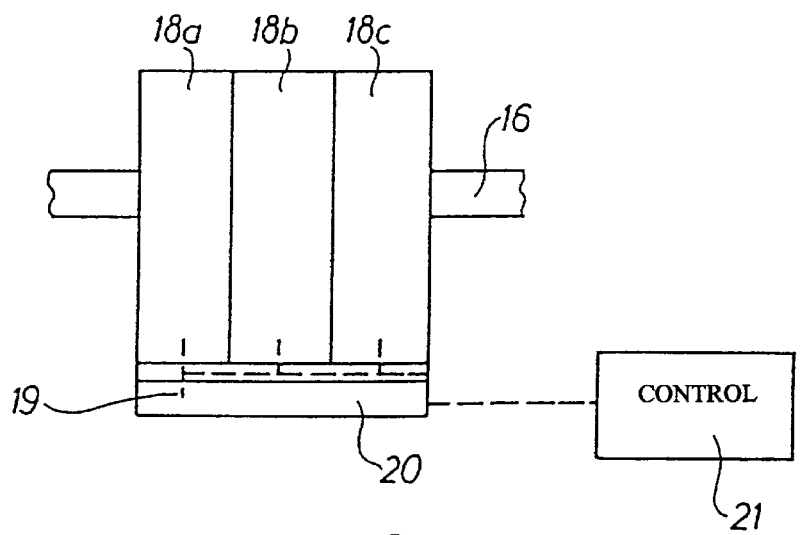
FIG. 2 is a diagrammatic view of the construction of a sensor means formed of three sensor members.

As shown in FIG. 2 the sensor means may comprise three sensor members, viz. a sensor member 18a for measuring the turbidity of the flushing fluid, a sensor member 18b for measuring the electrical conductivity of the flushing fluid and a sensor member 18c in form of an electric temperature sensor for measuring the temperature of the flushing fluid. These sensor members, which are adapted to generate electric signals, are shown parallel coupled and connected through conductors to an electric alarm device 20 such as a programming circuit, e.g. on a chip. They may also be coupled to a PLC and/or a PC. Optionally each of the electric signals supplied to the device 20 may be amplified by individual bias factors, before the sum signal is compared to the threshold value activating the alarm.

The sensor member 18a for measuring the turbidity may be a photo cell (not shown) provided with a light-emitting diode. Typically the light-emitting diode and the photo cell are interspaced by for instance 1 to 2 cm.

The sensor member 18b for measuring electrical conductivity may be formed of two interspaced electrodes in form of steel legs (not shown).

The sensor member 18c for measuring the temperature of the flushing fluid flowing out of the compartment 12 may be a digital thermometer (not shown). The sensor means is adjustable such that—if merely one of the sensor members reacts, the alarm device 20 activates an alarm signal in a suitable manner (at 21) for instance by rendering a wailing note and ringing tone or an electric gleam (local alarm) or cutting off the power to the motor of the centrifugal pump or changing a relay value perceived as an alarm by the overall control 21 (at a control panel) in the system in which the pump is used. The alarm device may for instance by set to a specific threshold value such that the alarm is only activated, when the total electric signal exceeds the threshold value.

Instead of being mounted in the discharge pipe 16, the sensor means may be built-in in the compartment 12 as shown at 18'. The built-in location is very close to the point at which the flushing fluid is discharged from the compartment 12, ie close to the discharge pipe 16. Practically all of the flushing fluid entering the compartment 12 flow through the sensor means. This sensor means ensures that the centrifugal pump is particularly reliable, the alarm device calling for assistance or generating a signal on the control panel 21, if an irregular leakage occurs through the primary seal 7.

The invention may be modified in many ways without thereby deviating from the scope of the invention.

If so desired, the flushing fluid may circulate in a closed, cooled circuit.

In order to obtain a reliable operation, the signals from the sensor members 18a, 18b and 18c should usually be standardised, before they are signal processed in the alarm device 20. The signal processing may be performed in a logical OR-circuit. It is also possible to transfer the signals from the three sensor members to a neural network (not shown) in the alarm device 20 for recognition of the signal patterns which have proved characteristic of the operation modes to be monitored (the leakage).

The circuit of the alarm device may also be adapted to monitor changes in the signal as time goes by.

Each of the sensor members may be adjusted to a specific threshold value which must be exceeded before the alarm device 20 accepts the signal from the sensor member in question. These threshold values may be adjusted to obtain the most advantageous relation between the probability of detecting an undesired event (leakage) and the probability of a false alarm.

What is claimed is:

1. Centrifugal pump, in particular a hygienic centrifugal pump, provided with a primary and a secondary shaft seal at the rear wall of the pump chamber (1) and in which cooling flushing and barrier fluid is passed to and from the compartment between said seals optionally in a flushing fluid circuit, characterised in that a sensor member is provided in or at a discharge pipe from the compartment between the primary and secondary seal said, member (18) being adapted to measure at least the turbidity, electrical conductivity and temperature of the flushing fluid for activation of an alarm in case of leaking pump fluid through the primary seal.

2. Centrifugal pump according to claim 1, characterised in that the sensor means comprises three sensor members, viz. a sensor member for measuring the turbidity of the flushing fluid, a sensor member for measuring the electrical conductivity of the flushing fluid and a sensor member in form of an electric temperature sensor for measuring the temperature of the flushing fluid, said sensor members which are adapted to render electric signals, are parallel coupled and connected to an electric alarm device such as an alarm circuit, e.g. on a chip, said alarm device optionally being coupled to an overall control.

3. Centrifugal pump according to claim 2, characterised in that the sensor member for measuring the turbidity may be a photo cell provided with a light-emitting diode.

4. Centrifugal pump according to claim 1, characterised in that the sensor member for measuring electrical conductivity may be formed of two mutually interspaced electrodes in form of steel legs.

5. Centrifugal pump according to claim 1, characterised in that the sensor member for measuring the temperature may be formed of a thermometer indicating the temperature digitally.

6. Centrifugal pump according to claim 1, characterised in that the sensor means is built-in in the compartment between the primary seal and the secondary seal in such a manner that it is very close to the location at which the flushing fluid is discharged from the compartment.

7. Centrifugal pump according to claim 1, characterised in that the signals from the sensor members are standardised before being processed in the alarm device.

8. Centrifugal pump according to claim 1, characterised in that the signal processing is performed in a logical OR-circuit.

9. Centrifugal pump according to claim 1, characterised in that the signals from the three sensor members are transferred to a neural network in the alarm device for recognition of the signal patterns which have proved characteristic of the operation modes to be monitored.

10. Centrifugal pump according to claim 1, characterised in that the circuit of the alarm device is adapted to monitor changes in the signals as time goes by.

11. Centrifugal pump according to claim 1, characterised in that a threshold value is set for each of the sensor members which is to be exceeded, before the alarm device accepts the signal from the sensor member in question.

12. Centrifugal pump according to claim 1, characterised in that the threshold values are such adjusted that the most advantageous relation between the probability of detecting an undesired event (leakage) and the probability of a false alarm is obtained.

* * * * *